US006954339B2

(12) United States Patent
Bement et al.

(10) Patent No.: US 6,954,339 B2
(45) Date of Patent: Oct. 11, 2005

(54) SUSPENSION ASSEMBLY INCLUDING A SHAPE MEMORY FLEXURE ELEMENT TO ADJUST FLEXURE OR PRELOAD FORCE

(75) Inventors: Gary E. Bement, Frederic, CO (US); James M. Murphy, Boulder, CO (US); Michael D. Mundt, Longmont, CO (US); Brian D. Denker, Rogers, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 300 days.

(21) Appl. No.: 09/970,125

(22) Filed: Oct. 3, 2001

(65) Prior Publication Data

US 2002/0044371 A1 Apr. 18, 2002

Related U.S. Application Data

(60) Provisional application No. 60/238,750, filed on Oct. 6, 2000, and provisional application No. 60/238,302, filed on Oct. 4, 2000.

(51) Int. Cl.$^7$ ............................................. G11B 5/56
(52) U.S. Cl. ................................................. 360/294.7
(58) Field of Search ..................................... 360/294.7

(56) References Cited

U.S. PATENT DOCUMENTS

| 4,605,979 A |   | 8/1986  | Inoue et al. ............... 360/105 |
|-------------|---|---------|-------------------------------------|
| 5,023,737 A |   | 6/1991  | Yaeger ....................... 360/105 |
| 5,060,099 A |   | 10/1991 | Yaeger et al. ............... 360/105 |
| 5,062,018 A |   | 10/1991 | Yaeger ....................... 360/104 |
| 5,303,105 A |   | 4/1994  | Jorgenson ................... 360/106 |
| 5,390,059 A | * | 2/1995  | Tokuyama et al. ........ 360/246.6 |
| 5,463,514 A |   | 10/1995 | Yaeger ....................... 360/105 |
| 5,657,188 A |   | 8/1997  | Jurgenson et al. ......... 360/106 |
| 5,745,319 A |   | 4/1998  | Takekado et al. ........ 360/78.05 |
| 5,808,837 A |   | 9/1998  | Norton ....................... 360/105 |
| 5,991,114 A |   | 11/1999 | Huang et al. ................ 360/75 |
| 6,297,937 B1 | * | 10/2001 | Schar ....................... 360/294.7 |
| 6,307,719 B1 | * | 10/2001 | Mallary ................... 360/294.7 |
| 6,501,625 B1 | * | 12/2002 | Boismier et al. ......... 360/294.7 |
| 6,614,625 B1 | * | 9/2003  | Kuwajima et al. ....... 360/254.7 |
| 6,614,627 B1 | * | 9/2003  | Shimizu et al. .......... 360/294.4 |

OTHER PUBLICATIONS

Abstract of Research from Yonsei University in Korea, 1 page, entitled "Non–Contact Start/Stop Suspension Using SMA" by Jong–Sung Park and Soo–Cheol Lim, at least as early as Nov. 15, 2000.

"Device for Dynamically Altering Slider Flying Height", IBM Technical Disclosure Bulletin, pp. 400–401, Oct. 1991.

Park et al., Jong–Sung, " Non–Contact Start/Stop Suspension Using SMA", Yonsei University, Center for Information Storage Device, at least by Nov. 15, 2000.

U.S. Appl. No. 09/204,642, filed Dec. 2, 1998, Schar.

IBM Technical Disclosure Bulletin, vol. 26, No. 2, Jul. 1983, pp. 846–849.

\* cited by examiner

*Primary Examiner*—A. J. Heinz
(74) *Attorney, Agent, or Firm*—Westman, Champlin & Kelly, P.A.

(57) ABSTRACT

A suspension assembly which can be energized to provide in-situs fly height adjustment for a head of a disc drive or energizable to adjust preload force for CSS. The suspension assembly includes a shape memory flexure element having an energizable length differential. In one aspect, the flexure element is integrated with a flexible suspension circuit which provides advantages for manufacture and assembly. In another aspect, the flexure element is coupled to a bending portion of the head suspension assembly and energized to adjust flexure of the suspension assembly relative to the bending portion.

21 Claims, 15 Drawing Sheets

SUSPENSION ASSEMBLY INCLUDING A SHAPE MEMORY FLEXURE ELEMENT TO ADJUST FLEXURE OR PRELOAD FORCE

CROSS-REFERENCE TO RELATED APPLICATION

The present application claims priority to Provisional Application Ser. No. 60/238,302 filed Oct. 4, 2000 and entitled "PRELOAD REDUCTION SYSTEM FOR SHOCK AND TRIBOLOGY" and Provisional Application Ser. No. 60/238,750 filed on Oct. 6, 2000 and entitled "IN-SITU FLY HEIGHT ADJUSTMENT METHODS USING SMA".

FIELD OF THE INVENTION

The present invention relates to a head suspension assembly for a data storage system. In particular, the present invention relates to a head suspension assembly with adjustable pre-load force or fly height.

BACKGROUND OF THE INVENTION

Data storage devices store digital information on a rotating disc. Heads are supported relative to the disc surface to read data from or write data to the disc. For proximity or near proximity recording, transducer elements are carried on an air bearing slider to form a data head to read data from or write data to the disc. The slider is flexibly coupled to a suspension assembly to pitch and roll relative to the disc surface. The suspension assembly supplies a load force to the slider at a load point about which the slider pitches and rolls.

Suspension assemblies are supported by actuator arms of an actuator block to move the slider or head relative to selected data tracks on the disc surface. For operation, rotation of the disc creates an air flow along the air bearing of the slider to create a hydrodynamic lifting force. The hydrodynamic lifting force is countered by the load force supplied by the suspension assembly so that the slider or head flies above the disc surface at a fly height defined in part by the hydrodynamic lifting force of the air bearing and the load force supplied by the suspension assembly. Variations in fly height parameters can affect read/write operations.

Prior to operation, the slider is parked on the disc surface for contact starts and stops (CSS). The interface between the slider and a lubricant film layer on the disc surface creates a stiction force holding the slider to the disc surface. For operation, sufficient power must be supplied so that the hydrodynamic lifting force overcomes the stiction force holding the slider to the disc surface for CSS. If the stiction force is too high, the slider will stick to the disc surface and "spin-up" operation of the CSS drive will fail. Thus, it is desirable to control the stiction force holding the slider to the disc surface for CSS.

Disc drive are susceptible to non-operational shock or vibration due to transport, installation or other reasons. Shock or impact to the disc drive can introduce vibration or movement of the head relative to the disc surface which can damage the head components and the disc surface. Damage to the head and disc surface can degrade read-write operations of the disc drive and introduce thermal asperities. The present invention addresses these and other problems and offers solutions not previously recognized nor appreciated.

SUMMARY OF THE INVENTION

The present invention relates to a suspension assembly which can be energized to provide in-situs fly height adjustment for a head of a disc drive or energized to adjust preload force for CSS. The suspension assembly includes a shape memory flexure element having an energizable length differential. In one aspect, the flexure element is integrated with a flexible suspension circuit which provides advantages for manufacture and assembly. In another aspect, the flexure element is coupled to a bending portion of the head suspension assembly and energizable to adjust flexure of the suspension assembly relative to the bending portion. These and various other features, as well as advantages which characterize the present invention, will be apparent upon reading the following detailed description and review of the associated drawings.

BRIEF DESCRIPTION OF THE DRAWINGS

FIG. 7-1 is a graphical illustration of a flexure profile of a suspension arm having a flexible bending portion along a cantilevered length of the suspension arm.

FIG. 9-1 is a graphical illustration of a flexure profile of a suspension arm along a portion of the cantilevered length of the suspension arm.

FIGS. 14-1 and 14-2 illustrate an embodiment of a suspension assembly including opposed flexure assemblies or elements for bi-directional actuation.

DETAILED DESCRIPTION OF ILLUSTRATIVE EMBODIMENTS

Figure 1:
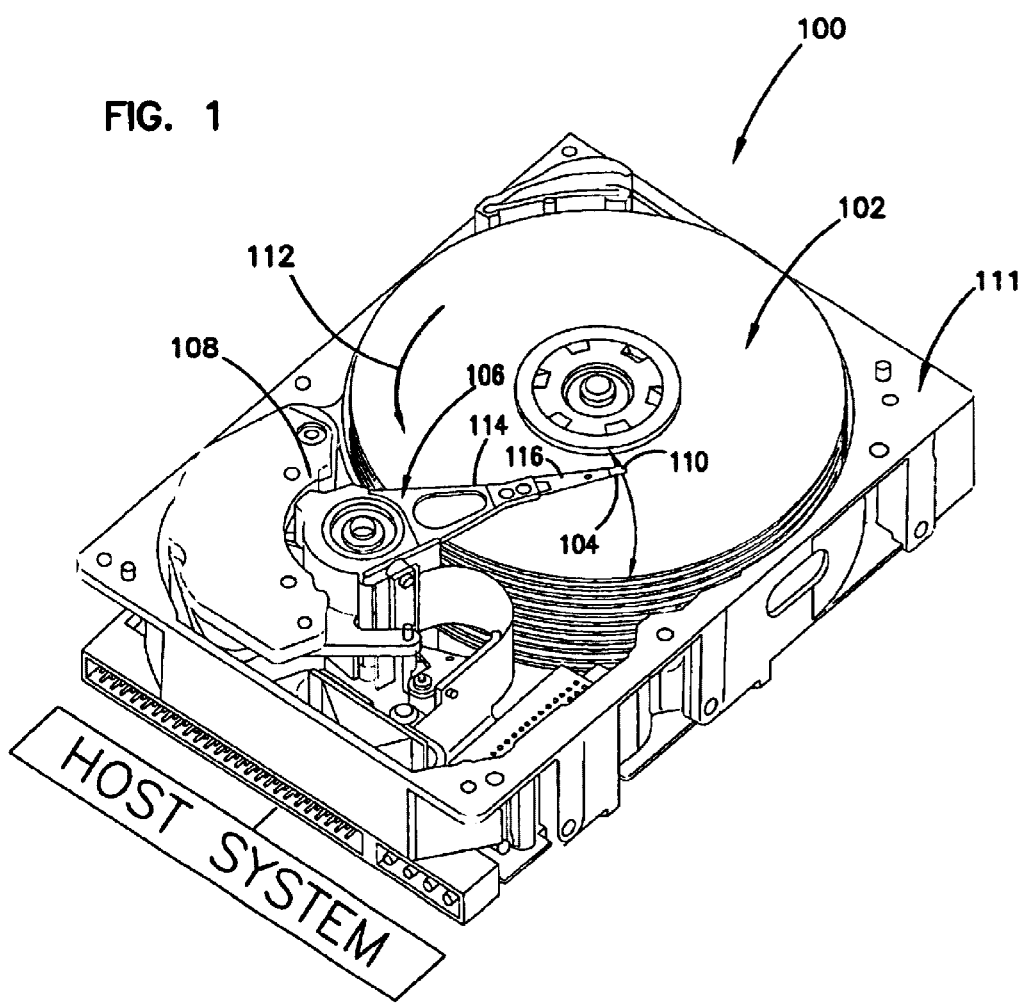
FIG. 1 is a perspective illustration of a disc drive.

FIG. 1 illustrates an embodiment of a disc drive 100 in which digital information is stored on a plurality of discs 102

(or single disc 102). Heads 104 are positioned relative to the disc surface to read data from or write data to the disc 102. Heads 104 are coupled to an actuator assembly 106 which is powered by a voice coil motor 108 to position heads relative to selected data tracks on the disc surface. Heads 104 include an air bearing slider 110 having transducer elements carried thereby for read-write operation. Transducer elements can be inductive, magnetoresistive or magneto-optical transducer elements. Components of the disc drive are supported relative to a base chassis 111 of the disc drive.

Figure 2:
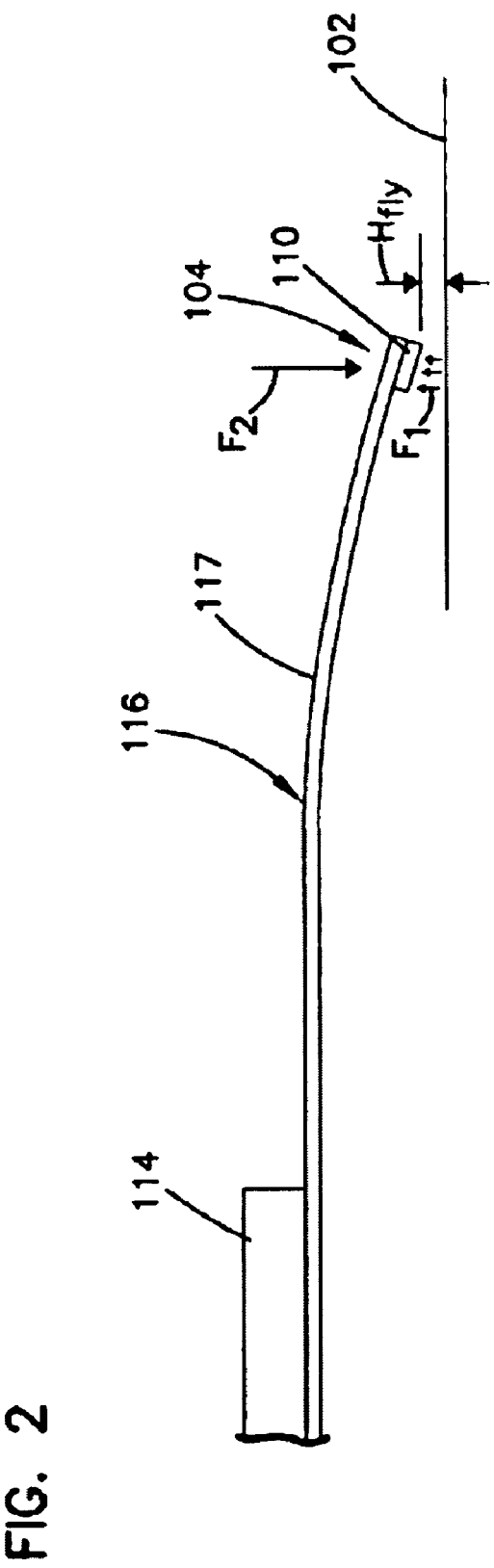
FIG. 2 is a schematic side view illustration of a suspension assembly having a head coupled thereto.

As shown, discs are supported for co-rotation as illustrated by arrow 112 by a spindle motor (not shown) for operation. The head or slider 110 is coupled to actuator arms 114 of the actuator assembly 106 through a suspension assembly 116. Rotation of the discs 102 creates an air flow along the air bearing surface of the slider 110 to provide a hydrodynamic lifting force $F_1$ in a first direction to the slider 110 as illustrated in FIG. 2. The suspension assembly 116 includes a suspension arm 117 which supplies a pre-load force $F_2$ in a second opposite direction to the slider 110 which counters the hydrodynamic lifting force $F_1$.

For operation, the equilibrium of the pre-load force $F_2$ and the hydrodynamic lifting force $F_1$ define in part a fly height $H_{fly}$ of the slider 110 for read/write operations. A real disc drive density is increasing and thus lower fly heights $H_{fly}$ are desired for optimizing read-write clarity and resolution. The lower fly height of the slider 110 reduces acceptable fly height variations or fly height sigma. Preload force can be adjusted to adjust fly height of the slider. For example, a larger preload force $F_2$ can be supplied to reduce the fly height of the slider. Increased preload force $F_2$, however, increases stiction force holding the slider to the disc surface which increases the power required for "spin-up" for CSS. A larger stiction force also increases wear which degrades mechanical reliability. Non-operational shock or impact to the disc drive during idle or non-operational periods for CSS, (i.e. when the head is parked on the disc surface) can vibrate or move the head degrading or damaging the head components. A larger preload force can reduce non-operational shock, however, the larger preload force can increase the stiction force and power requirements for CSS.

Figure 3:
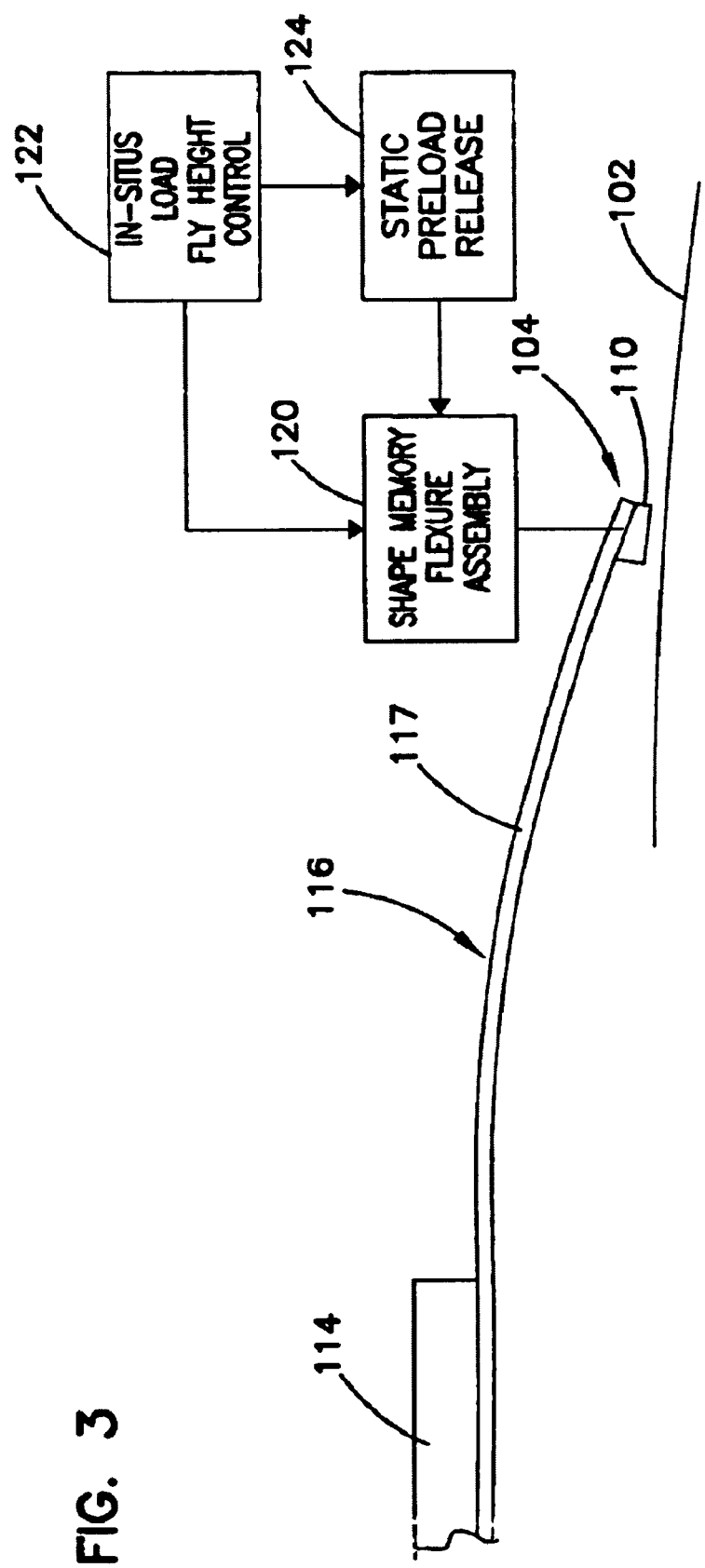
FIG. 3 is a schematic side view illustration of a suspension assembly including a shape memory flexure element for in-situs preload or fly height control.

The present invention relates to a suspension assembly including a shape memory flexure assembly 120 as illustrated in FIG. 3 which is energizable to provide in-situs preload adjustment as shown in the illustrated embodiment. In particular, the shape memory flexure assembly 120 can be energized for fly height control as illustrated by block 122. The shape memory flexure assembly 120 can be used to energize a static preload release as illustrated by block 124 to provide a relative high preload force for non-operational shock control and a reduced pre-load force for "spin-up" or "spin-down" to reduce stiction and power for CSS "spin-up" and "spin-down". The suspension assembly to be described will provide these and other in-situs adjustment or control features.

Figure 4:
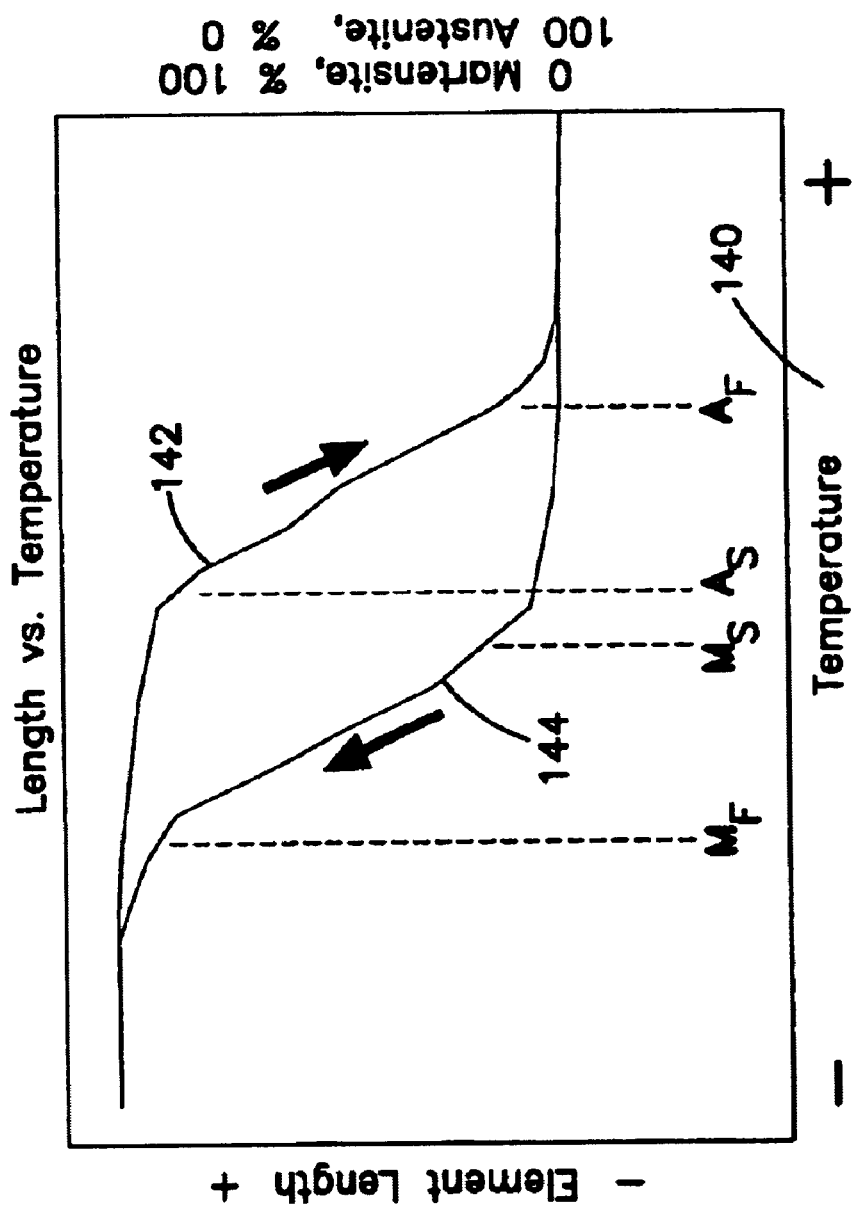
FIG. 4 graphically illustrates a length dimension differential as a function of temperature for a shape memory alloy.

As shown in FIG. 4, the shape memory flexure assembly 120 includes a shape memory alloy element SMA, such as Nitinol (a nickel-titanium alloy) which when heated as illustrated by temperature axis 140 undergoes a length dimension change as illustrated by line 142. As shown by line 142, the length dimension of the shape memory alloy constricts as the material structure changes from a martensite to austenite. As illustrated by line 144, the length dimension of the shape memory alloy is restored to the original length dimension when the element is cooled to provide shape memory.

Figure 5:
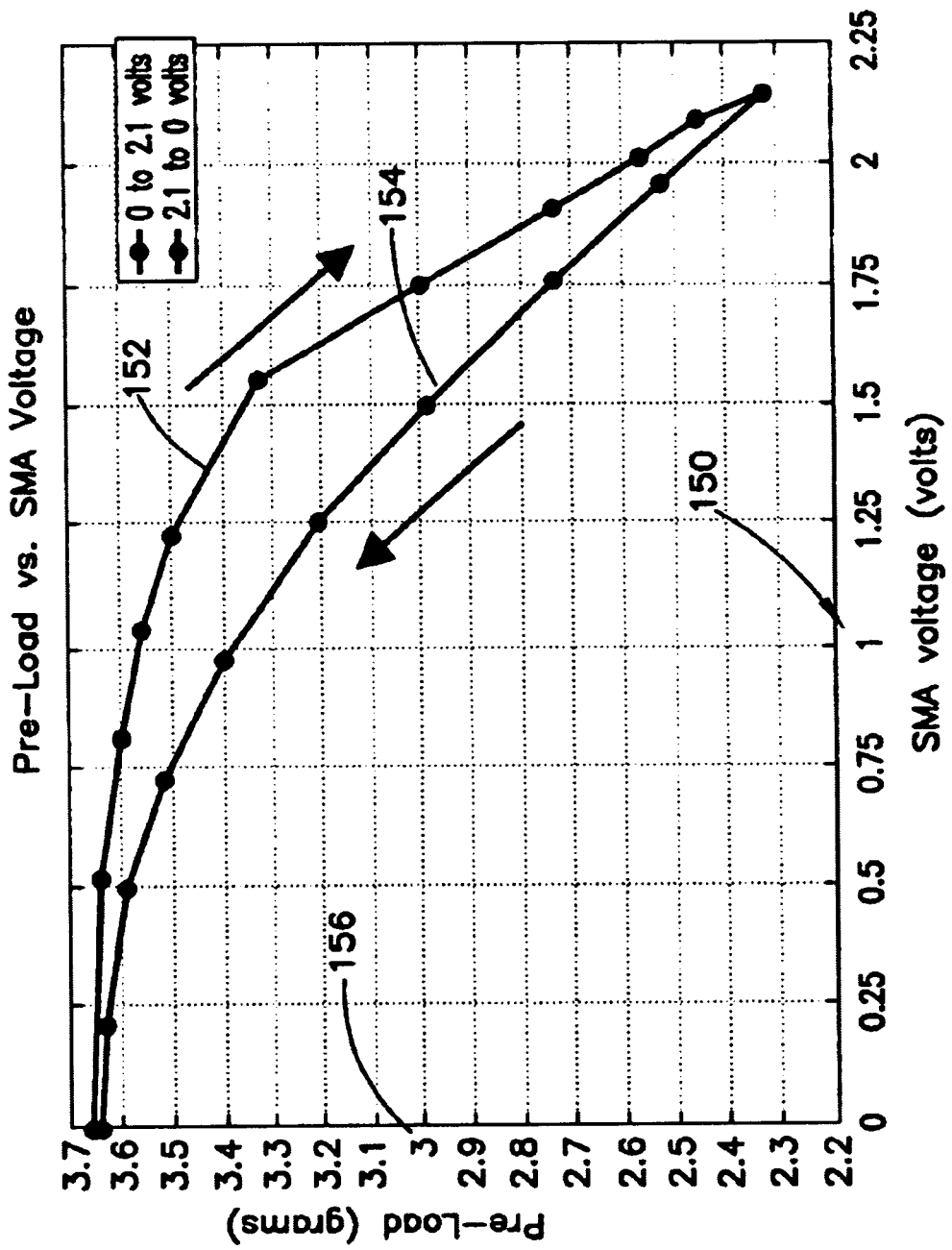
FIG. 5 is a graphical illustration of preload force as a function of voltage for an embodiment of a suspension assembly including a shape memory flexure assembly or element.

As shown in FIG. 5, the shape memory flexure assembly 120 is energized by heating the shape memory element by supplying a voltage potential across a length dimension of the shape memory element or elements as illustrated by axis 150. The voltage potential changes or contracts the length dimension of the shape memory element to reduce the preload force supplied to the head 104 as illustrated by line 152. As shown by line 154, when the voltage potential is removed, the length dimension returns to its original dimension and the preload, as illustrated by axis 156, increases or returns to the pre-excited magnitude although the system must compensate for a small hysteresis.

Figure 6:
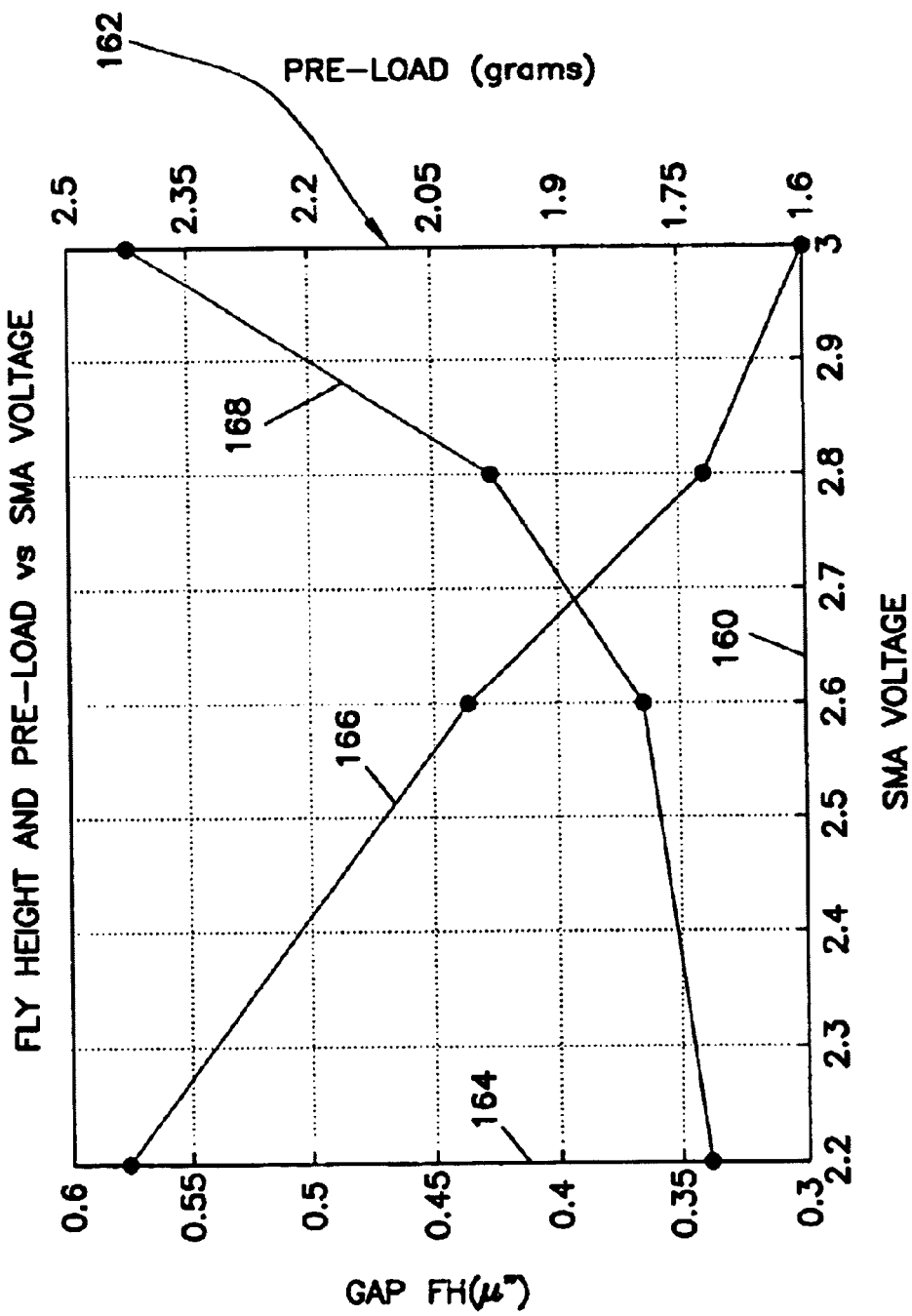
FIG. 6 is a graphical illustration of preload force and fly height relative to voltage for an embodiment of a suspension assembly including a shape memory flexure assembly or element.

Thus, as illustrated in FIG. 5, a high static preload force of approximately 4.0 g can be reduced to 2.3 g by energizing the flexure or shape memory assembly 120 to provide a pre-load release for "spin-up" or "spin-down" for CSS. As shown in FIG. 6, voltage is supplied to the shape memory element of the flexure assembly 120 as illustrated by axis 160 to adjust the preload force as illustrated by axis 162 or fly height gap as illustrated by axis 164. In particular, voltage is supplied to reduce preload as illustrated by line 166 and to increase or adjust fly height as illustrated by line 168 for in-situs preload or fly height control.

Figure 7:
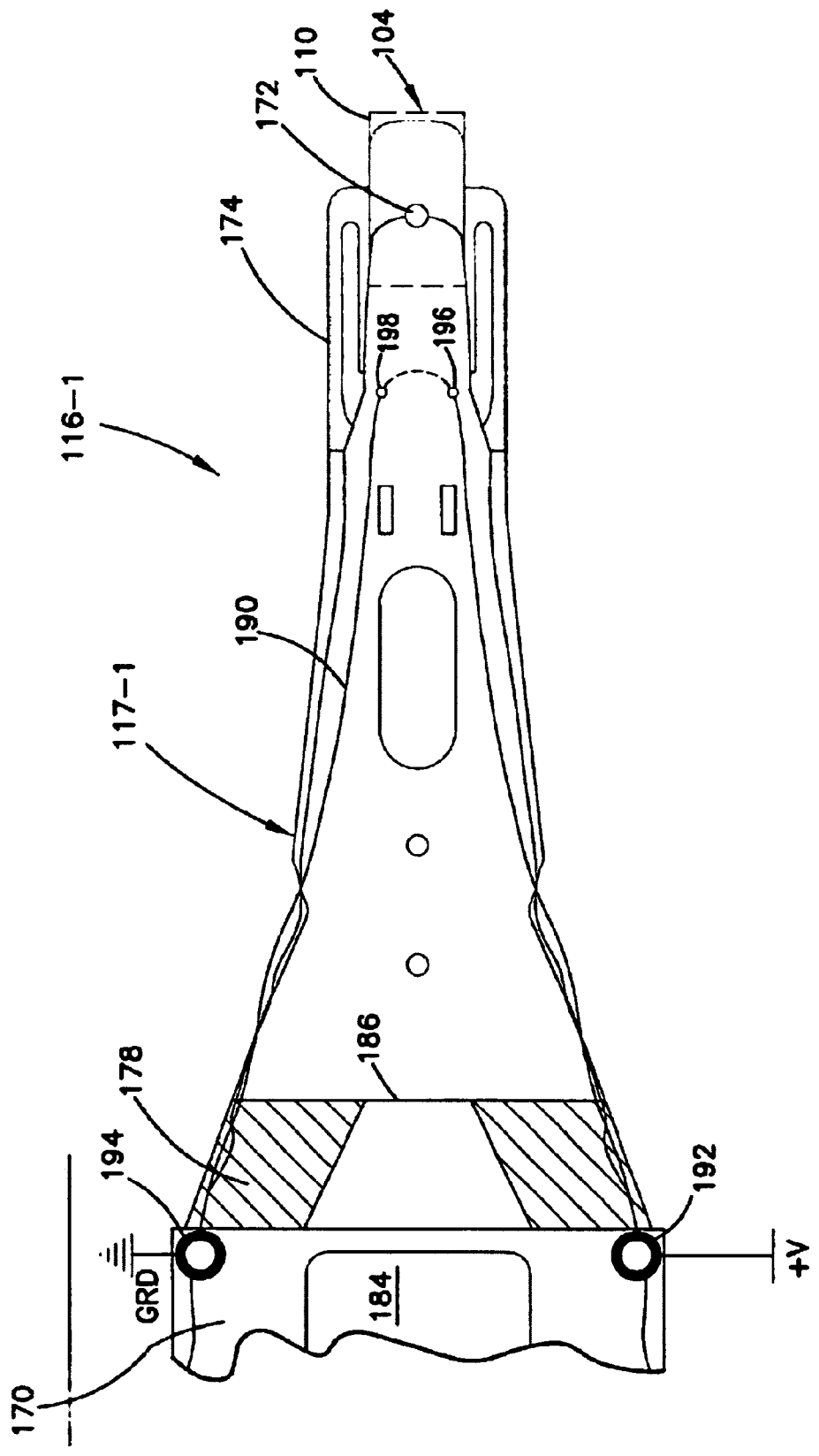
FIG. 7 is a plan view of an embodiment of a suspension assembly including a shape memory flexure assembly for adjusting preload force or fly height of the head.
Figures 1, 7:
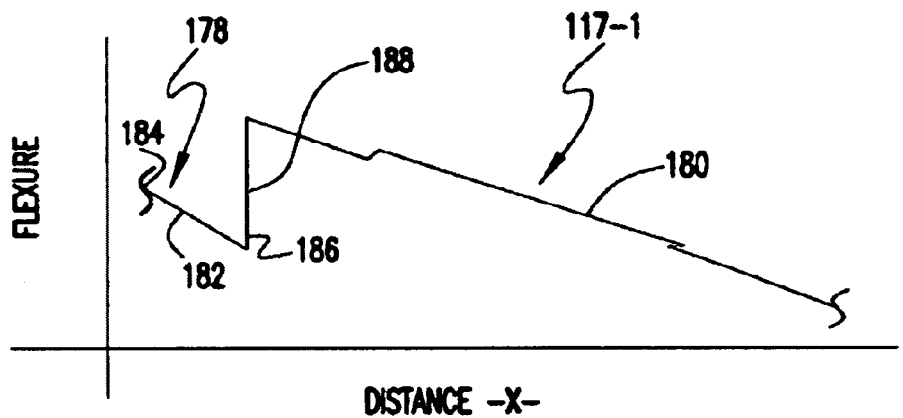

FIG. 7 illustrates one embodiment of a suspension assembly 116-1 with a shape memory flexure assembly where like numbers are used to refer to like parts in the previous FIGS. As illustrated the suspension assembly 116-1 includes a mounting plate 170 which is typically staked to the actuator arm 114 of the actuator assembly 106 and an elongated suspension arm 117-1 extending from the mounting plate 170 which supplies the preload force to the slider at a load point 172. The slider 110 is coupled to the suspension arm 117-1 through a gimbal spring 174 to pitch and roll relative to load point 172 of the suspension to follow the topography of the disc surface.

In the embodiment shown, the suspension arm 117-1 includes an elongated cantilevered length having a flexible bending portion 178 along the cantilevered length of the suspension arm 117-1. In the illustrated embodiment, the bending portion 178 provides a flexible connection between the elongated cantilevered length of the suspension arm 117-1 and the mounting plate 170. As graphically shown in FIG. 7-1, the suspension arm 117-1 include a variable flexure strength 180 along an extended length of the suspension arm 117-1. The bending portion 178 has a reduced flexure strength as illustrated by portion 182 between a proximal end 184 and distal end 186 of the bending portion 178. As graphically shown, the suspension arm 117-1 includes a flexure step increase 188 from the distal end 186 of the reduced strength bending portion 178 and the cantilevered length of the suspension arm 117-1 extending therefrom to provide a reduced strength portion about which the suspension arm 117-1 flexes.

The shape memory flexure assembly includes a shape memory flexure element or elements having an energizable length differential. The shape memory flexure element or elements are coupled relative to the proximal and distal ends 184, 186 of the flexure bending portion 178 so the flexure elements extend across the flexible bending portion 178 to bend or adjust flexure of the suspension arm. In the particular embodiment shown in FIG. 7, the flexure element is a shape memory alloy wire 190 having opposed terminals or ends 192, 194. End 192 extends from a first side of the mounting plate 170 to an extended position of the suspension arm 117-1 distal of the bending portion 178 and from the extended position to the second terminal or end 194 on a second side of the mounting plate 170. The wire 190 is secured to the extended position of the suspension arm 117-1 through cooperating holes 196, 198 which allows the wire 190 to slide or move relative to the assembly.

A voltage is supplied across terminals 192, 194 or wire 190 to constrict the length of the wire 190 to flex the suspension arm 117-1 about the bending portion 178 in a direction opposed to the direction of the preload force to reduce the preload force for dynamic operation or to adjust the preload force for in-situs fly height control. In particular, wire 190 is assembled on a surface of the suspension facing away from the slider 110 and disc surface so that contraction of the wire 190 causes the suspension to flex away from the disc surface and the direction of the preload force $F_2$. The bending portion 178 of the suspension arm 117-1 flexes to accommodate constriction of the SMA wire 190 extending across proximal and distal ends 184, 186 of the bending portion 178 and fixedly secured to the mounting plate 170 and the extended position of the suspension arm 117-1.

Figure 8:
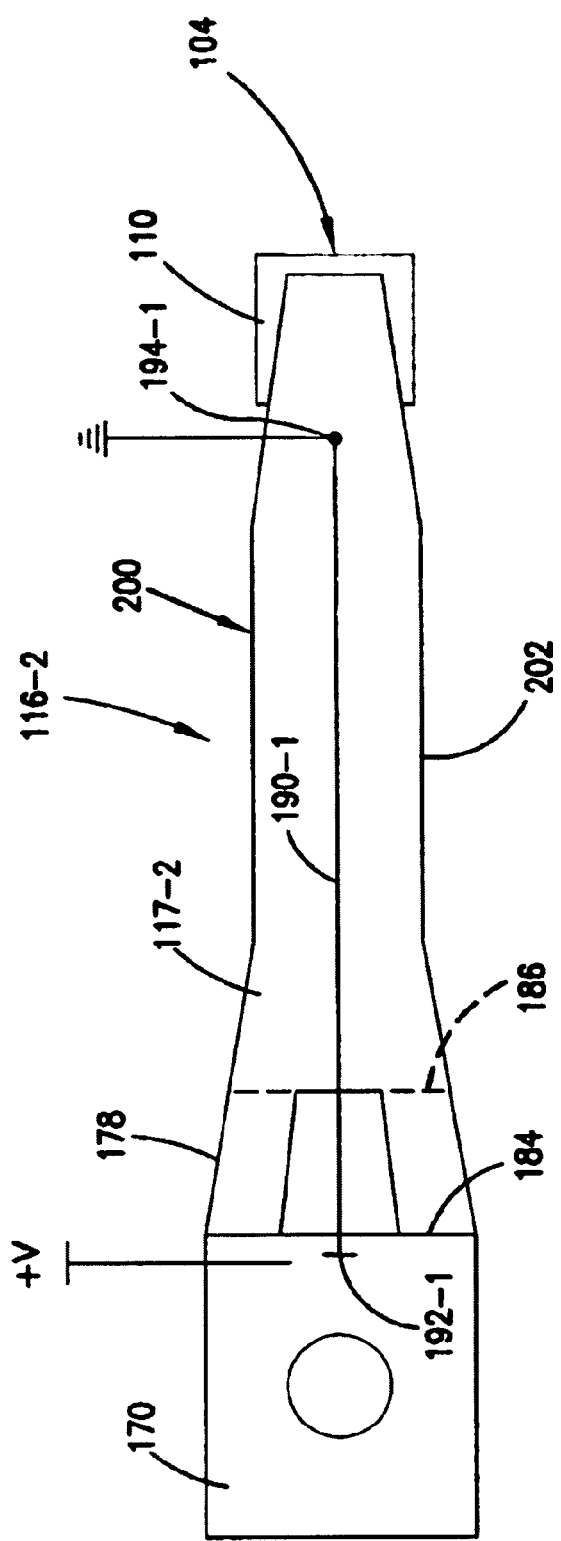
FIG. 8 is a plan view of an embodiment of a suspension assembly including a shape memory flexure assembly for adjusting preload force to or fly height of the head.
Figure 9:
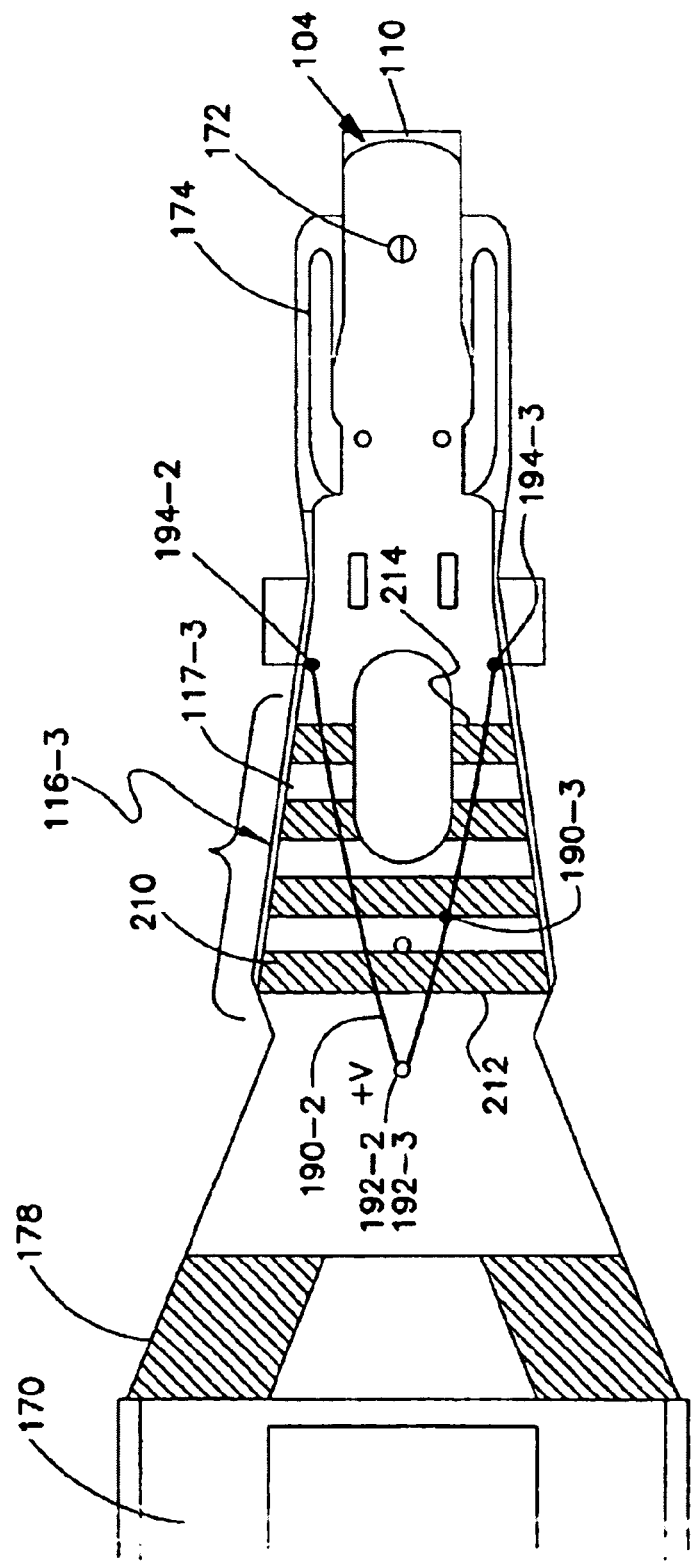

FIG. 8 illustrates an alternate suspension assembly 116-2 where like numbers are used to identify like parts in the previous FIGS. As shown, the shape memory flexure assembly includes a shape memory wire 190-1 having an elongated length extending between terminals or ends 192-1, 194-1. End 192-1 is coupled to the mounting plate 170 and extends to end 194-1 connected to an extended portion of the suspension arm 117-2 distal of end 186 of the bending portion 178 so that wire 190-1 extends across bending portion 178 to bend or adjust flexure of the suspension arm 117-2 at the bending portion 178. Wire 190-1 or the shape memory element extends along a center portion of the suspension arm 117-2 between opposed sides 200, 202. Similarly a voltage potential is supplied across terminals or ends 192-1, 194-1 to constrict the length of wire 190-1 to flex the suspension arm 117-2 about the flexible bending portion 178. Although in the illustrated embodiment, distal terminal 194-1 is grounded, application is not limited to the specific embodiment shown and alternatively terminal 192-1 can be grounded.

Figures 1, 9:
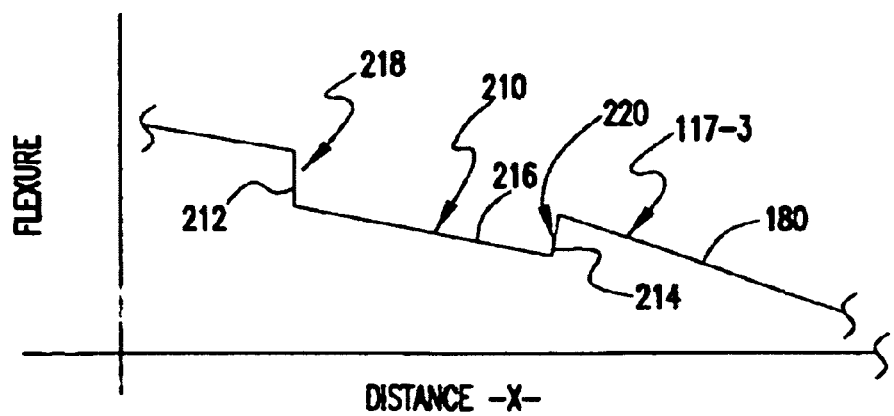
FIG. 9 is a plan view of an embodiment of a suspension assembly including a shape memory flexure assembly or element for adjusting preload to or fly height of the head.

FIG. 9 illustrates an alternate embodiment of a suspension assembly 116-3 which can be adapted for incremental fly height adjustments for in-situs fly height control. In the suspension assembly 116-3 shown, the suspension arm 117-3 includes multiple bending portions including a first bending portion 178 and a second intermediate bending portion 210 along the cantilevered length of the suspension arm 117-3. As shown, the second bending portion 210 is distally spaced from the first bending portion 178 and includes a flexible portion having a proximal end 212 and a distal end 214. As illustrated in FIG. 9-1, the second bending portion 210 has a reduced flexure strength as graphically illustrated by portion 216 between proximal and distal ends 212, 214 of the second bending portion 210. As shown, the flexure strength includes a flexure strength step 218 from a proximal portion of the suspension arm 117-3 to the reduced strength bending portion 210 and a flexure strength step 220 from the reduced strength bending portion 210 to a distal portion of the suspension arm 117-3 arm as illustrated in FIG. 9-1.

As shown in FIG. 9, flexure assembly is coupled across opposed end 212, 214 of the bending portion 210 and is energizable to adjust the flexure of the bending portion 210. In the particular embodiment shown, the flexure assembly includes energizable shape memory elements or wires 190-2, 190-3 having proximal and distal ends 192-2, 192-3, 194-2, 194-3. Ends 192-2, 192-3 are secured to the suspension arm 117-3 proximal from the proximal end 212 of the second bending portion 210 and the ends 194-2, 194-3 are secured to the suspension arm 117-3 distal from the distal end 214 of the bending portion 210. As previously described the shape memory elements or wires 190-2, 190-3 are energized to flex the suspension arm relative to bending portion 210 to adjust fly height of or preload force to the head 104. In the illustrated embodiment, bending portion 210 is stiffer than the reduced bending strength of bending portion 178 to provide an intermediate stiffness. Although FIG. 9 illustrates multiple bending portions and wires 190-2, 190-3, application is not limited to the specific embodiments shown. For example, the suspension can include a single intermediate bending portion or the flexure assembly can include a single element or wire.

Figure 10:
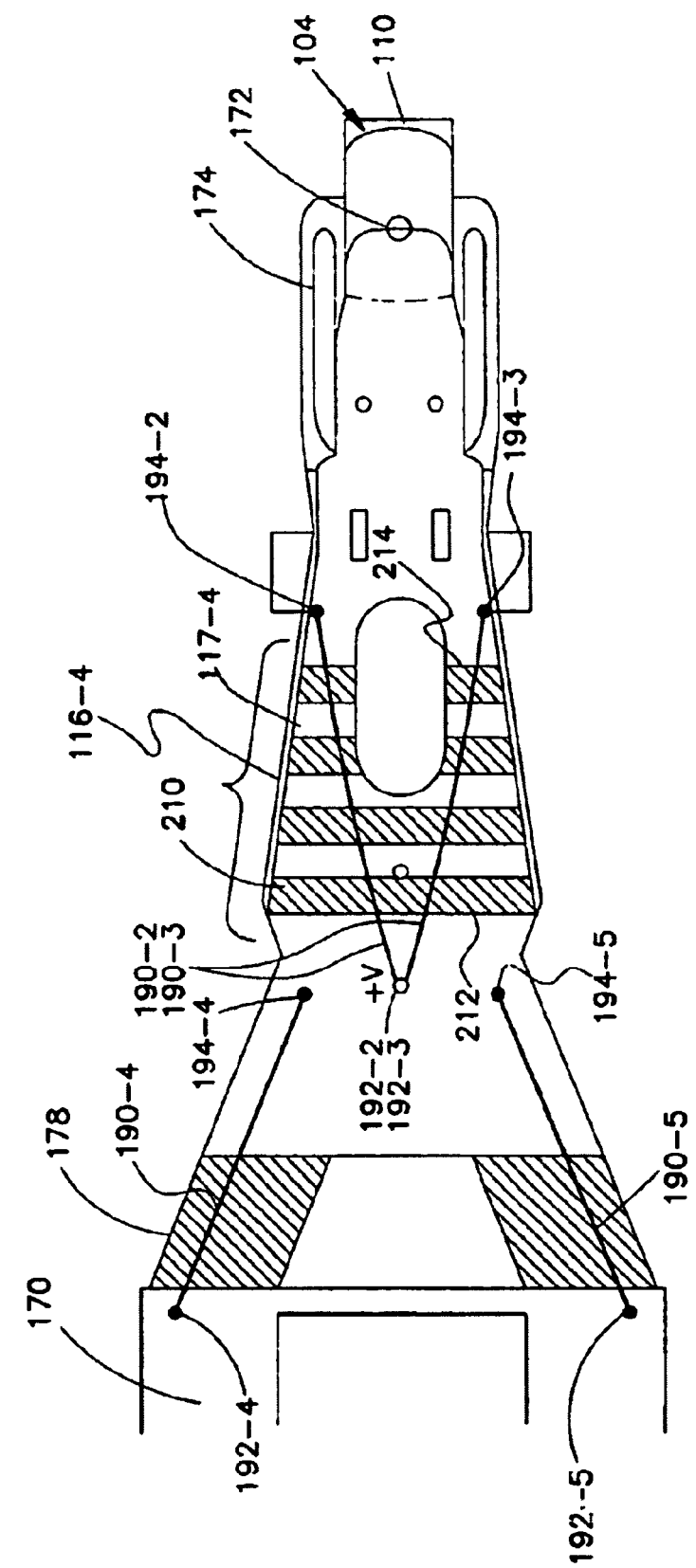
FIG. 10 is a plan view of an embodiment of a suspension assembly including a shape memory flexure assembly or element for adjusting preload to or fly height of the head.

FIG. 10 illustrates an alternate embodiment of a suspension assembly 116-4 having a suspension arm 117-4 including first and second bending portion 178, 210 similar to FIG. 9 where like numbers are used to identify like parts. As shown in FIG. 10, a first flexure assembly is coupled to the first bending portion 178 to adjust flexure of the suspension arm 117-4 about the first bending portion 178 and a second flexure assembly is coupled to the second bending portion 210 to adjust flexure of the suspension arm 117-4 relative to the second bending portion 210. In particular, the first flexure assembly can be energized to release a static preload force and the second flexure assembly can be energized to incrementally adjust fly height or preload force for in-situs operation control.

In the particular embodiment shown, the first and second flexure assemblies include shape memory flexure elements or wires 190-2, 190-3, 190-4, 190-5 including terminals 192-2, 192-3, 192-4, 192-5 and 194-2, 194-3, 194-4, 194-5. Ends 192-2, 192-3 of wires 190-2, 190-3 are connected proximal of the proximal end 212 of bending portion 210 and ends 194-2, 194-3 of wires 190-2, 190-3 are connected distal of the distal end 214 of bending portion 210. Ends 192-4, 192-5 and ends 194-4, 194-5 of wires 190-4, 190-5 are connected proximal and distal of bending portion 178 and are energizable to adjust flexure or, in one embodiment, to activate a static preload release.

Figure 11:
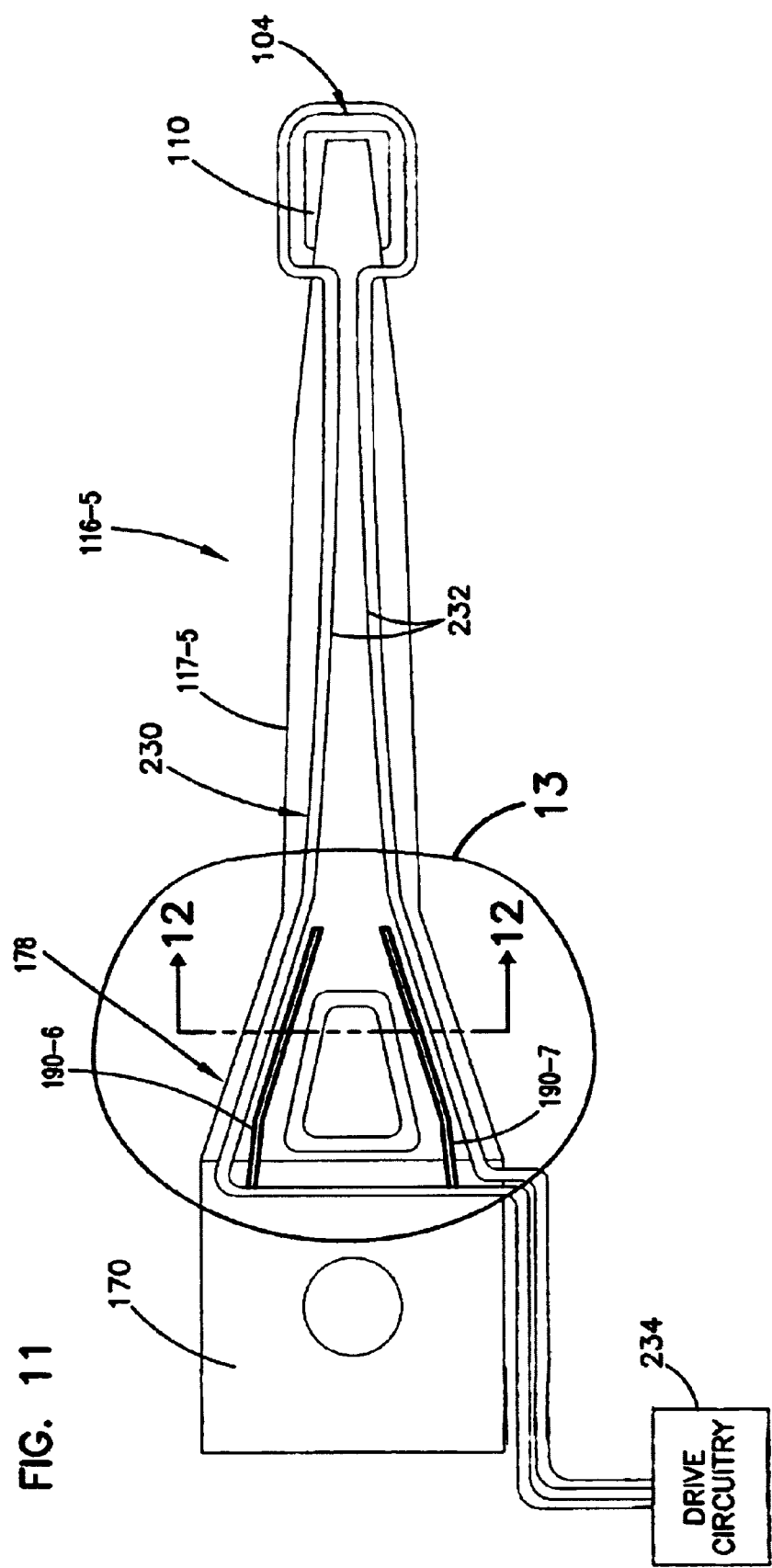
FIG. 11 illustrates an embodiment of a suspension assembly including an integrated flexure assembly fabricated on a flexible suspension circuit for electrically interfacing transducer elements of the head to drive circuitry.
Figure 12:
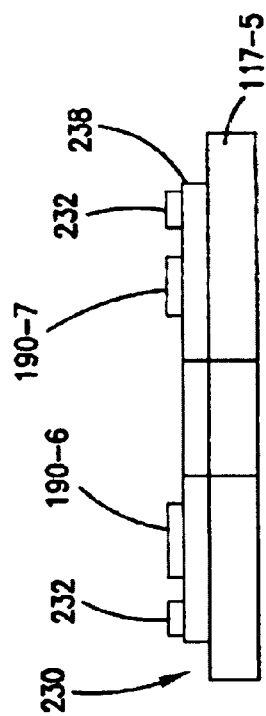
FIG. 12 is a cross-sectional view taken along lines 12—12 of FIG. 11.
Figure 13:
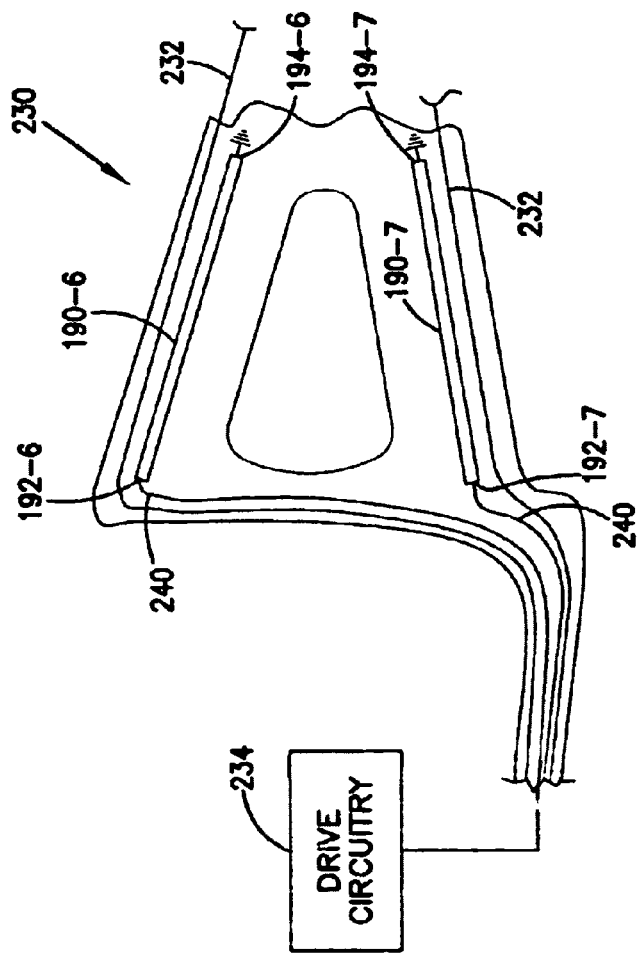
FIG. 13 is an exploded view of portion 13 of FIG. 11.

FIGS. 11–13 illustrate a suspension assembly 116-5 including an elongated suspension arm 117-5 where like numbers are used to identify like parts in the previous FIGS. In the illustrated embodiment, the flexure assembly includes flexure elements 190-6, 190-7 which are integrated on a flexible suspension circuit 230 having a plurality of transducer leads or paths 232 to conductivity couple transducer elements (not shown) of the head 104 to drive circuitry 234 for read/write operations. The flexible suspension circuit 230 is coupled to the suspension 117-5 and includes a flexible insulated base 238 (e.g. formed of a polyimide base material) as shown in FIG. 12. Transducer leads or path 232 are printed on the flexible insulated base 238 by known fabrication techniques to electrically interface transducer elements to drive circuitry 234.

In the integrated flexible suspension circuit 230, shape memory alloy (SMA) members 190-6, 190-7 are printed on the insulated base 238 and are energized to flex the suspension to adjust preload force. In the illustrated embodiment, a plurality of spaced shape memory alloy members 190-6, 190-7 are positioned on opposed sides of the suspension arm 117-5 and extend across flexible bending portion 178 of suspension arm 117-5, although application is not limited to multiple flexure members or the particular flexible bending portion shown. The members or elements 190-6, 190-7 include opposed ends or terminals 192-6, 192-7 and 194-6 and 194-7. As shown in the detailed illustration of FIG. 13, the integrated flexible suspension circuit 230 includes flexure leads 240 to connect opposed terminals 192-6, 192-7, 194-6, 194-7 of SMA members 190-6, 190-7 to a voltage source to supply a voltage potential along the length of members 190-6, 190-7 to contract the length dimension. In the particular illustrated embodiment, terminals 194-6, 194-7 are grounded although application is not so limited to grounding terminals 194-6, 194-7.

In the illustrated embodiment, SMA members 190-6, 190-7 extend along the bending portion 178 to flex the suspension, however, application is not limited to the particular bending portion shown and the suspension assembly can include an intermediate bending portion or multiple bending portion having an energizable flexure element coupled thereto. Thus, as described, the integrated flexible circuit provides a single assembly component for controlling preload force or fly height of the slider and providing an electrical interface for transducer elements of the head to drive circuitry 234 for ease of manufacture and assembly.

Figures 1, 14:
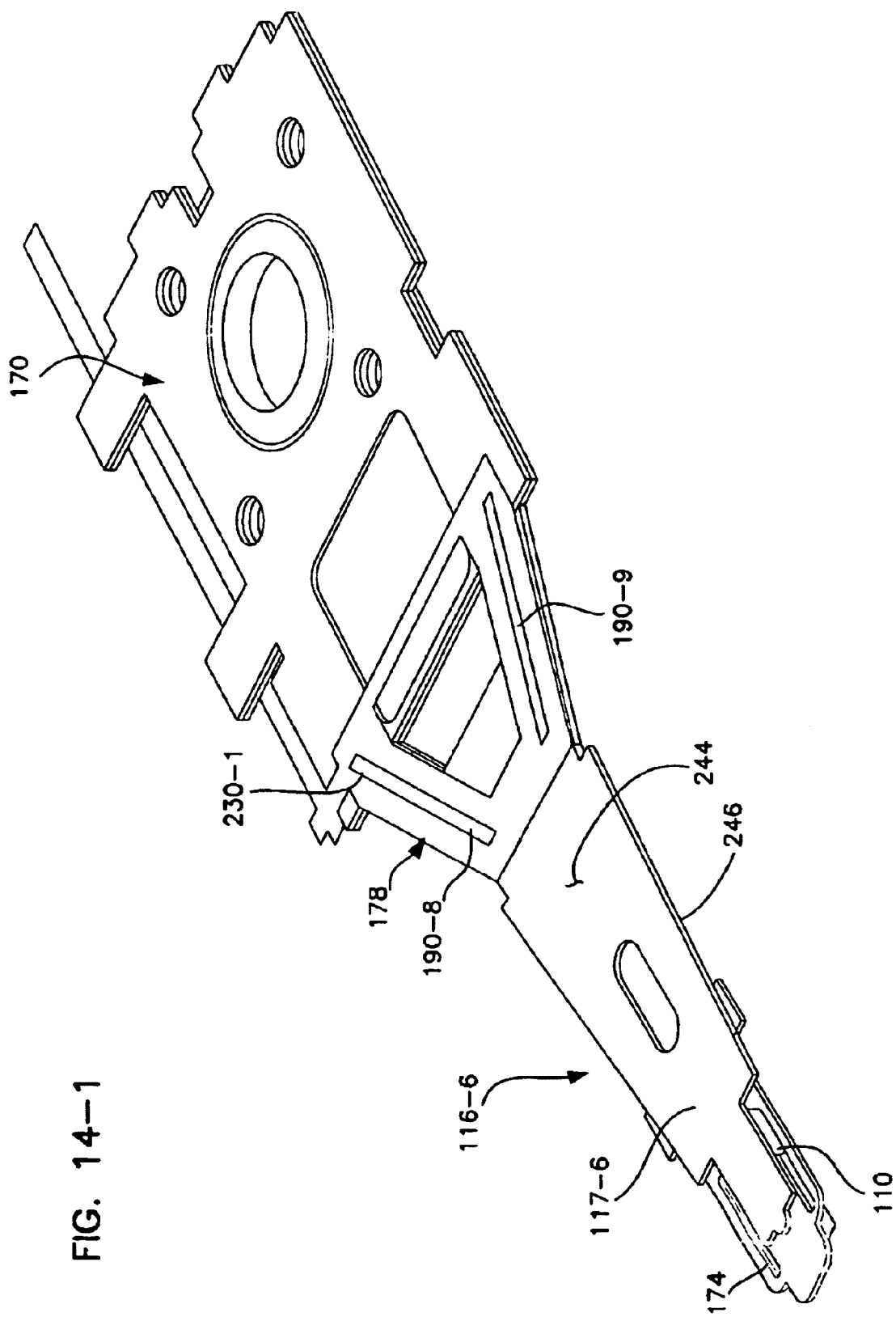
Figures 2, 14:
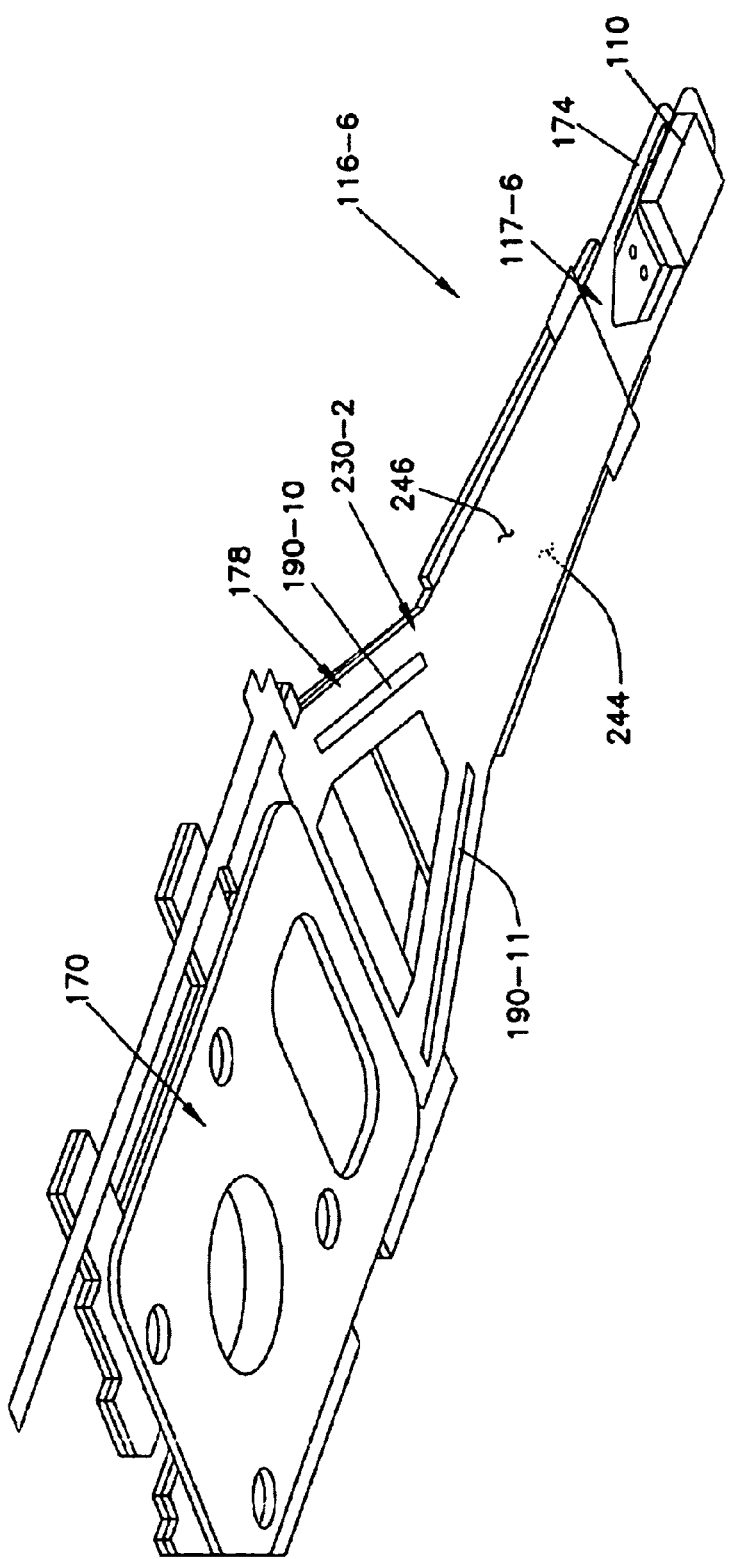

FIGS. 14-1 and 14-2 illustrate a suspension assembly 116-6 where like numbers are used to refer to like parts in the previous FIGS. The suspension assembly 116-6 includes a suspension arm 117-6 including opposed energizable flexure assemblies on opposed surfaces 244, 246 of the suspension arm 117-6 for bi-directional adjustment of preload force or fly height. In the particular embodiment shown, flexure assemblies include shape memory flexure elements 190-8, 190-9, 190-10, 190-11 printed on flexible suspension circuits 230-1, 230-2 on opposed surfaces 244, 246 of the suspension arm 117-6. Thus, flexure assemblies or flexure elements are selectively energized to increase preload force or reduce fly height or to decrease preload force or increase fly height. In particular, flexure elements 190-8, 190-9 on surface 244 the suspension arm 117-6 can be energized to constrict the length of flexure elements 190-8, 190-9 to reduce preload force and increase fly height of the suspension or alternatively flexure elements 190-10, 190-11 can be energized to constrict the length of the flexure elements 190-10, 190-11 to increase preload force and reduce fly height.

A suspension assembly (such as 116) including a suspension arm (such as 117) having shape memory flexure elements (such as 190) having an energizable length differential. As shown, flexure elements (such as 190) are coupled to bending portions (such as 178, 210) on the suspension arm (such as 117) to adjust preload or fly height. As shown in FIGS. 11–13, 14-1 and 14-2, flexure elements (such as 190) are integrated onto a flexible suspension circuit (such as 230) to provide an integrated assembly for adjusting flexure and electrically interfacing transducers on the head to drive circuitry.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the fall extent indicated by the broad general meaning of the terms in which the appended claims are expressed. For example, the particular elements may vary depending on the particular application while maintaining substantially the same functionality without departing from the scope and spirit of the present invention. In addition, although the preferred embodiments described herein are directed to particular suspension embodiments, it will be appreciated by those skilled in the art that the teachings of the present invention can be applied to other suspension embodiments, without departing from the scope and spirit of the present invention.

What is claimed is:

1. A flexible suspension circuit comprising:
   a flexible insulated base;
   a plurality of transducer leads printed on the flexible insulated base; and
   a flexure element formed of a shape memory material on the flexible insulated base to provide a flexure force.

2. The flexible suspension circuit of claim 1 and further comprising flexure leads fabricated on the flexible insulated base and conductivity coupled to the flexure element to supply a voltage potential across opposed ends of the flexure element.

3. The flexible suspension circuit of claim 1 wherein the flexible insulated base is formed of a polyimide material.

4. The flexible suspension circuit of claim 1 including a plurality of flexure elements formed of a shape memory material at spaced positions on the flexible insulated base.

5. A head suspension assembly comprising:
   a suspension portion including a bending portion between a proximal end and a distal end of the suspension portion and the bending portion having a reduced flexure strength; and
   a flexure element formed of a shape memory alloy material having an elongated length extending across the bending portion with a first end of the flexure element coupled to the suspension portion proximal of the bending portion and a second end of the flexure element coupled to the suspension portion distal of the bending portion wherein the flexure element is energized to provide in-situs adjustment of one of fly height of a head or the head suspension assembly or preload force to the head.

6. The suspension assembly of claim 5 including a plurality of flexure elements formed of the shape memory material having opposed first and second ends coupled to the suspension portion proximal and distal of the bending portion.

7. The head suspension assembly of claim 5 wherein the suspension portion supplies a static preload force to the head and the flexure element is energized to release the static preload force for operation.

8. The head suspension assembly of claim 5 wherein the bending portion includes a proximal end and a distal end and the bending portion having a flexure strength increase from the distal end of the bending portion to a distal portion of the suspension portion.

9. The head suspension assembly of claim 5 wherein the flexure element is printed on a flexible suspension circuit comprising a flexible insulated base having transducer leads printed on the flexible insulated base to electrically interface transducer elements of a head of the head suspension assembly to drive circuitry.

10. The head suspension assembly of claim 5 assembled in a disc drive and the disc drive includes a "spin-up" control mode and a "read/write" control mode wherein in the "spin-up" control mode, the flexure element is energized to release a static preload force to reduce stiction during "spin-up".

11. The head suspension assembly of claim 10 wherein the flexure element is energized to adjust the preload force to a head or fly height of the head or the head suspension assembly in the read/write control mode.

12. The head suspension of claim 5 wherein the suspension portion includes multiple spaced bending portions having reduced flexure strength and at least one of the multiple spaced bending portions includes the flexure element formed of the shape memory alloy material extending thereacross.

13. The head suspension of claim 12 including a plurality of flexure elements formed of the shape memory alloy material including a first shape memory flexure element coupled to one of the multiple spaced bending portions and a second shape memory flexure element coupled to another of the multiple spaced bending portions.

14. An assembly comprising:
- a head suspension including a suspension portion including a proximal end and a distal end and the suspension portion including a proximal bending region having a reduced bending flexure and the head suspension including a head portion carried proximate to the distal end of the suspension portion; and
- a fly height controller including a flexure element formed of a shape memory alloy energizable to adjust flexure of the proximal bending region of the suspension portion to adjust a fly height of the head portion of the head suspension.

15. The assembly of claim 14 wherein the flexure element extends along the proximal bending region.

16. The assembly of claim 14 wherein the suspension portion includes a plurality of bending portions including a first bending portion and a second bending portion and the flexure element extends across the first bending portion or the second bending portion.

17. The assembly of claim 14 wherein the suspension portion includes a plurality of bending portions including a first bending portion and a second bending portion distally spaced from the first bending portion and the flexure element extends across the second bending portion.

18. The assembly of claim 14 wherein the suspension portion includes a plurality of bending portions including a first bending portion proximally spaced from a second bending portion and the flexure element extends across the first bending portion.

19. A method comprising a step of:
- energizing a shape memory alloy flexure element to adjust flexure of a proximal bending region of a head suspension having a head or slider carried proximate to a distal end of the head suspension to adjust one of a fly height of the head or slider relative to a disc surface or preload force.

20. The method of claim 19 and comprising the step of:
- energizing the shape memory alloy flexure element to reduce a pre-load force for contact starts and stops.

21. The method of claim 19 wherein the shape memory alloy is energized to adjust or control fly height of the head or slider.

\* \* \* \* \*